(12) United States Patent
Gil et al.

(10) Patent No.: US 8,670,153 B2
(45) Date of Patent: Mar. 11, 2014

(54) ATTRIBUTE DRIVEN GAMUT MAPPING VIA A MINIMIZED MULTI-OBJECTIVE CUMULATIVE COST FUNCTION

(75) Inventors: Alvaro Enrique Gil, Rochester, NY (US); Lalit Keshav Mestha, Fairport, NY (US); Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 752 days.

(21) Appl. No.: 12/942,414

(22) Filed: Nov. 9, 2010

(65) Prior Publication Data

US 2012/0113440 A1 May 10, 2012

(51) Int. Cl.
*H04N 1/60* (2006.01)
*G06K 9/00* (2006.01)

(52) U.S. Cl.
USPC .............. 358/1.9; 358/518; 345/690; 382/162

(58) Field of Classification Search
None
See application file for complete search history.

(56) References Cited

U.S. PATENT DOCUMENTS

| | | | |
|---|---|---|---|
| 7,768,672 B2 | 8/2010 | Gil et al. | |
| 2004/0109180 A1* | 6/2004 | Braun et al. | 358/1.9 |
| 2008/0043263 A1 | 2/2008 | Hancock et al. | |
| 2010/0020106 A1* | 1/2010 | Gil et al. | 345/690 |
| 2010/0128976 A1* | 5/2010 | Stauder et al. | 382/162 |

OTHER PUBLICATIONS

Wu et al., "Image Quality Performance for a Color Marking Device", U.S. Appl. No. 12/727,692.
Wu et al., "Updating an Image Quality Metric Database to Account for Printer Drift", U.S. Appl. No. 12/781,988.
Dalal et al., "Color Mapping Determination for an N-Color Marking Device Based Upon Color Stability", U.S. Appl. No. 12/727,760.
Dalal et al., "Color Mapping Determination for an N-Color Marking Device Based Upon Image Spatial Noise Defects", U.S. Appl. No. 12/727,791.
Mestha et al., "Reducing Noise Induced by Color Mixing Spot Color Recipe Search", U.S. Appl. No. 12/581,566.
Mestha et al., "Recent Developments Towards Control-Based Color Profiling Technoloby", Xerox Corporation (USA); NIP25: International Conference on Digital Printing Technologies and Digital Fabrication 2009, vol. 25, pp. 350-353, ISBN/ISSN: 978-089208-2872.

* cited by examiner

*Primary Examiner* — Firmin Backer
*Assistant Examiner* — Christopher D Wait
(74) *Attorney, Agent, or Firm* — Philip E. Blair; Fleit Gibbons Gutman Bongini & Bianco P.L.

(57) ABSTRACT

What is disclosed is a novel system and method for mapping out-of-gamut colors to a device's gamut to improve image quality in a color document reproduction device involves performing the following. First, an out-of-gamut color $x_i$, which is intended to be mapped to a boundary surface of a color gamut of a color marking device, is selected. A gamut mapping function is also selected. The selected gamut mapping function is intended to be applied to the selected out-of-gamut color point. At least one performance attribute is then selected for the color marking device and a multi-objective cumulative cost $J_T$ is determined based upon a combination of costs $J_{gm}$ and $J_s$. The multi-objective cumulative cost $J_T$ is then iteratively driven to a minimum. Once the minimum has been determined, a gamut mapping of the selected out-of-gamut color can then be performed using the minimized multi-objective cumulative cost. Various embodiments are disclosed.

20 Claims, 3 Drawing Sheets

ATTRIBUTE DRIVEN GAMUT MAPPING VIA A MINIMIZED MULTI-OBJECTIVE CUMULATIVE COST FUNCTION

TECHNICAL FIELD

The present invention is directed to systems and methods for mapping out-of-gamut colors using optimization algorithms that minimize a cost of multiple objectives which include a particular gamut mapping application and one or more desired image quality attributes for image quality enhancement in xerographic and N-color marking devices.

BACKGROUND

Customers often wish to produce the best color on printers. Many rich chromatic colors are generally out-of-gamut and, as such, these are mapped to within the reproducible gamut of the output device using various strategies that seek to satisfy different mapping performance metrics such as, for example, chroma, hue, nearest, luminance scaling, and the like. When one of these mapping performance metrics is used to map out-of-gamut colors, prior art techniques that deal with mapping based upon one or more objectives is found adequate. However, when important performance metrics such as, for example, graininess, mottle, color stability, and the like, come into play, it is desirable for some customers to place appropriate weightings on such parameters to set trade-offs between gamut mapping and image quality. This would give customers freedom to set constraints during mapping out-of-gamut colors. Each customer's objective may be different while rendering out-of-gamut colors.

Accordingly, what is needed in this art are increasingly sophisticated systems and methods which effectively minimize a multi-objective performance function for mapping out-of-gamut colors to achieve the objectives by obtaining feedback control laws that result in convergence.

INCORPORATED REFERENCES

The following U.S. patents, U.S. Patent Applications, and Publications are incorporated herein in their entirety by reference.

"Image Quality Performance For A Color Marking Device", U.S. patent application Ser. No. 12/727,692, by Wu et al.

"Updating An Image Quality Metric Database To Account For Printer Drift", U.S. patent application Ser. No. 12/781, 988, by Wu et al.

"Color Mapping Determination For An N-Color Marking Device Based Upon Color Stability", U.S. patent application Ser. No. 12/727,760 by Dalal et al.

"Color Mapping Determination For An N-Color Marking Device Based Upon Image Spatial Noise Defects", U.S. patent application Ser. No. 12/727,791 by Dalal et al.

"Optimal Spot Color Recipes Using Variable GCR Profiles", U.S. patent application Ser. No. 12/118,771, by Wu et al. filed Oct. 12, 2010

"Method, Apparatus And Systems To Retrieve GCRs from Historical Database", U.S. Publication No. 20090296107 by Mestha et al.

"Reducing Noise Induced By Color Mixing Spot Color Recipe Search", U.S. patent application Ser. No. 12/581,566 by Mestha et al.

"Image Output Color Management System And Method", U.S. Publication No. 20080252931 by Mestha et al.

"System And Method For Automated Spot Color Editor", U.S. Publication No. 20080043263, by Hancock et al.

"Spot Color Control System And Method", U.S. Pat. No. 7,768,672 to Gil et al.

"*Recent Developments Towards Control-Based Color Profiling Technology*" by Lalit K. Mestha, Alvaro E. Gil, Yao Rong Wang, Marty S. Maltz, and Raja Bala, Xerox Corporation (USA); NIP25: International Conference on Digital Printing Technologies and Digital Fabrication 2009, Vol. 25, pp. 350-353, ISBN/ISSN: 978-089208-2872.

BRIEF SUMMARY

What is disclosed is a novel system and method for mapping out-of-gamut colors using feedback based (controls) optimization algorithms that minimize a cost function containing two or more objectives. The cost function is a linear combination of image quality (IQ) related parameters (e.g., graininess, mottle, etc.) and gamut mapping-related parameters (e.g., dECIELAB, dE2K, hue, etc.). The present method uses control-based optimization to map out-of-gamut colors to the device's gamut based upon a user-selected multi-objective performance metric which includes a set of variables that are considered important to the customer. The techniques presented herein assume that models for the image quality parameters of customers' interest are available for optimization. The models can be built offline, a priori. When sensing methods are available (e.g., Full Width Array), IQ metrics are directly extracted from the sensor during feedback. The teachings hereof utilize multi-objective feedback control laws or optimization theory to map colors that are out-of-gamut to inside or on printer's gamut in such a way that they can satisfy minimization of a multi-objective cost function within the feedback loop. The cost function contains one or more objectives that are related to gamut mapping and IQ. Advantageously, the present system and method effectively allows customers of complex color document reproduction devices to specify the trade-offs in terms of deltaE units away from normal gamut mapping in favor of image quality values by certain counts or vice-versa.

In one example embodiment, the present method for mapping out-of-gamut colors to a device's gamut to improve image quality in a color document reproduction device involves performing the following. First, an out-of-gamut color $x_i$, which is intended to be mapped to a boundary surface of a color gamut of a color marking device, is selected. A gamut mapping function is also selected. The selected gamut mapping function is intended to be applied to the selected out-of-gamut color point. At least one performance attribute is then selected for the color marking device. A multi-objective cumulative cost ($J_T$) is determined based upon a combination of the cost ($J_{gm}$) of the gamut mapping function and the cost ($J_s$) of the performance attribute. The multi-objective cumulative cost is then iteratively driven to a minimum. Once the minimum value of the multi-objective cumulative cost has been determined, the out-of-gamut color can be gamut mapped using the minimized function. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for mapping out-of-gamut colors using feedback based (controls) optimization algorithms that minimize a cost function containing two objectives. The cost function is a linear combination of image quality (IQ) related parameters (e.g., graininess, mottle, etc.) and gamut mapping-related parameters (e.g., dECIELAB, dE2K, hue, etc). The present method uses control-based optimization to map out-of-gamut colors to the device's gamut based upon a user-selected multi-objective performance metric which includes a set of variables that are considered important to the customer. The techniques presented herein assume that models for the image quality parameters of customers' interest are available for optimization.

It should be understood that one of ordinary skill in this art would be readily familiar with many facets of color science and image processing, optimization theory, and other techniques and algorithms known to the color science arts. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

The "gamut" refers to a complete subset of color values of a given color space as defined by the spectrum of light, i.e., the distribution of light energy versus wavelength, interacting with the spectral sensitivities of the eye's light receptors and the colorants on the substrate. The gamut of a color marking device, for example, is a multi-dimensional color space having a given volume with the axes of the space being defined by the pigments used in the colorants of the primary colors. The color gamut is defined by the interaction of the primary colors, and is limited by amount of toner pigments that can be deposited on the image-receiving medium. Converting a digitized image to a different color space, or outputting it to a given medium using a certain output device, generally alters its gamut, in the sense that some of the colors in the original are lost in the color transformation process.

A "gamut mapping function" refers to any algorithm or strategy which defines a relationship between a set of input color values of a first color gamut to a corresponding set of output color values of a second color gamut. The first and second color gamuts may or may not be in the same color space. There is a cost associated with a gamut mapping function. Such costs can have many forms such as, for example, computational complexity, time, and resources involved such as memory, storage, bandwidth, etc. The end-user decides which costs are important to them for any given gamut mapping function selected.

A "performance attribute" broadly defines one or more attributes of interest which affect a color quality performance of a N-color marking device, where N≥3. Such an attribute may be an image quality attribute, as defined herein further, or some other attribute, such as ink cost, temporal color variation, and the like, which has a cost which is intended to be combined with the cost of a gamut mapping function to obtain a multi-objective cumulative cost. The cost of any given performance attribute will have the form of: (1) measurement cost such as raw-data acquisition (sensing), computational complexity, time, and resources involved to obtain the corresponding image quality metric values and (2) customer dissatisfaction due to unacceptable prints. The overall cost will vary depending on the complexity of the color marking device being targeted by an application of the teachings hereof.

An "image quality attribute" is a mathematical definition for determining a given image quality defect, such as, for instance, graininess, mottle, banding, streaking, and temporal color variation (color stability). The term image quality attribute can also be used to describe the underlying variation of raw color data from which higher-level metrics can be derived. Example image quality metrics are described in: *International Print Quality Standard*—ISO/IEC 13660:2001 which specifies device-independent image quality metrics, measurement methods, and analytical procedures used to describe a quality of an image output from a document reproduction device. As used herein, image quality attributes are any combination of graininess, mottle, banding, streaking, and temporal color variation, and may further include ink cost, or ink cost reduction.

"Graininess" is an image quality attribute which is defined as the a-periodic fluctuation of density at a spatial frequency greater than 0.4 cycles per millimeter in all directions. Other definitions, such as with different spatial frequency ranges and/or measuring fluctuation at different color space (e.g. L* rather than density), exist as well. Methods to quantify graininess are well established.

"Banding" is another image quality attribute which consists of either horizontal or vertical bands, with a period that gradually varies from a minimum to a maximum value. Banding can thus be defined as a 1D image density variation in the process direction. It is often periodic and it can result from errors in the mechanical motion of rotating components, such as gears, pinions, and rollers in the charging and development subsystems, photoreceptors and their drive trains, or the ROS polygon, within a marking engine.

"Mottle" is another image quality attribute consisting of the irregular arrangement of patches of color on an output print due to defective toner transfer from the belt to the image forming surface. Mottle is similar to graininess, but on a larger spatial scale (>250 μm). Various metrics have been developed by vendors, some proprietary, which are used to determine lightness variation of mottle. ISO-13660:2001 defines mottle as the Standard Deviation (STD) of Optical Density (OD) (rather than L*) between 1.27×1.27 mm$^2$ and 12.7×12.7 mm$^2$ scale over a defined spatial frequency. Xerox, in one embodiment, defines mottle as the standard deviation of L* (together with an OD correction) between 1.1×1.1 mm$^2$ and 5.5×5.5 mm$^2$ scale.

"Streaking" is an image quality attribute consisting of pseudo-random one-dimensional defects that run parallel to the process direction. Streaking defects can arise from a non-uniform LED imager, contamination of the high voltage elements in a charger, scratches in the photoreceptor surface, etc. Graininess and mottle are usually not directionally oriented whereas streaks usually are.

"Temporal color variation" refers to the consistency of color reproduction of a given target marking device. Color instability may be attributed to such factors as, for example, photoreceptor or charging device non-uniformity, variation in temperature or humidity, age of the photoreceptor unit, age of an individual toner color, or other like environmental and/or mechanical factors. In addition, changes in media weight or mechanical alignment of the machine components may result in color-to-color registration errors, which can impact color stability. Various complex control and sensor systems are often employed to improve color stability.

A "color marking device" refers herein to a wide variety of print system device architectures. The set of print system devices includes monochrome or color digital document reproduction architectures, document scanning systems, a wide variety of printers/copiers, book/magazine/newspaper, digital printing presses, and other multi-function document reproduction systems. One example color marking device is shown and discussed with respect to color marking device 226 of FIG. 2. Such systems generally include a display device such as a CRT or touch screen along with one or more user interfaces such as a keyboard, mouse, keypad, touchpad, and the like, for entering data and configuring device-specific settings to optimize image quality and performance. Providing the image of a document to such an output device is intended to mean communicating the image to the output device by transmitting the image in the form of signals over a network connection, interface, or other communication pathway, for rendering to viewable form. The step of providing the image to an output device is also intended to include storing the signals of the digital document image to a memory or storage media for subsequent retrieval. A color marking device may include an image processing system which performs the methods described herein further. The image processing system can be hardware and/or software which may reside in the image path. It should also be understood that one or more functions, features, or capabilities performed by a computer system or special purpose processor (such as an ASIC), may be integrated, in whole or in part, with any system or sub-system of such a system.

A "storage device" refers to a device or system to store electronic documents or images. One embodiment of a storage device is a database, as shown and discussed with respect to 210 of FIG. 2. Storage devices are well known in the arts and may include RAM, ROM, Cache, CD-ROM, DVD, flash drives, hard drives, and other media capable of storing images, documents, and data for subsequent retrieval.

General Discussion

Let x be an input vector that contains CMYK or N-colorants. Let $P_i$, i=1, 2, ..., N define the $i^{th}$ model that estimates the output $y_i$ given the input x. For instance, $y_i$ could be the mapped $L*a*b*_m$ of the original $L*a*b*$ when a certain gamut mapping method is applied. It could also contain the amount of graininess or mottle estimated when input x is used for reproducing the desired $L*a*b*_m$.

A total cost of applying a total of N performance attributes is given by:

$$J_S = \sum_{i=1}^{N} J_i \quad (1)$$

A total cumulative multi-objective cost is given by:

$$J_T = J_{gm} + J_S \quad (2)$$

where $J_{gm}$ is the cost of gamut mapping using a gamut mapping function and $J_S$ is the total cost associated with each of the selected performance attributes.

A weighting $w_i$ may be applied to each cost of associated with each respective performance attribute, such that the total cost of Eq. (1) becomes:

$$J_S = \sum_{i=1}^{N} w_i J_i \quad (3)$$

where N is the number of performance costs selected.

The total cost $J_S$ may alternatively be expressed as:

$$J_S = \sum_{i=1}^{N} w_i (J_i^d - J_i)^2, \quad (4)$$

where N is the number of performance attributes, $w_i$ is a weighting, and $J_i^d$ is a desired cost of applying the $i^{th}$ performance attribute.

A weighting $w_{gm}$ may be applied to the cost of the gamut mapping function such that the multi-objective cumulative cost of Eq. (2) becomes:

$$J_T = w_{gm} J_{gm} + J_s. \quad (5)$$

The multi-objective cumulative cost of Eq. (5) can be expressed as:

$$J_T = w_{gm}(J_{gm}^d - J_{gm})^2 + J_S \quad (6)$$

where $J_{gm}^d$ is a desired cost of mapping an out-of-gamut point using a particular gamut mapping function.

If experienced customers have previous knowledge of the desired feasible levels for each performance attribute cost $J_i$, then the multi-objective cumulative cost can be expressed as follows:

$$J_T = w_{gm} J_{gm} + \sum_{i=1}^{N} w_i (J_i^d - J_i)^2. \quad (7)$$

If the interest is in limiting only the gamut mapping and not the performance attribute cost, then the multi-objective cumulative cost can be expressed as:

$$J_T = w_{gm}(J_{gm}^d - J_{gm})^2 + \sum_{i=1}^{N} w_i J_i. \quad (8)$$

When there is interest in achieving desired levels in both the performance attribute and gamut mapping cost functions, then the multi-objective cumulative cost can be expressed as:

$$J_T = w_{gm}(J_{gm}^d - J_{gm})^2 + \sum_{i=1}^{N} w_i (J_i^d - J_i)^2. \quad (9)$$

Other variations considered by those familiar with optimization theory, are intended to fall within the scope of the appended claims. It should be appreciated that the weights applied for each cost function are assigned depending on the desired emphasis on each individual cost.

Example Flow Diagram

Figure 1:
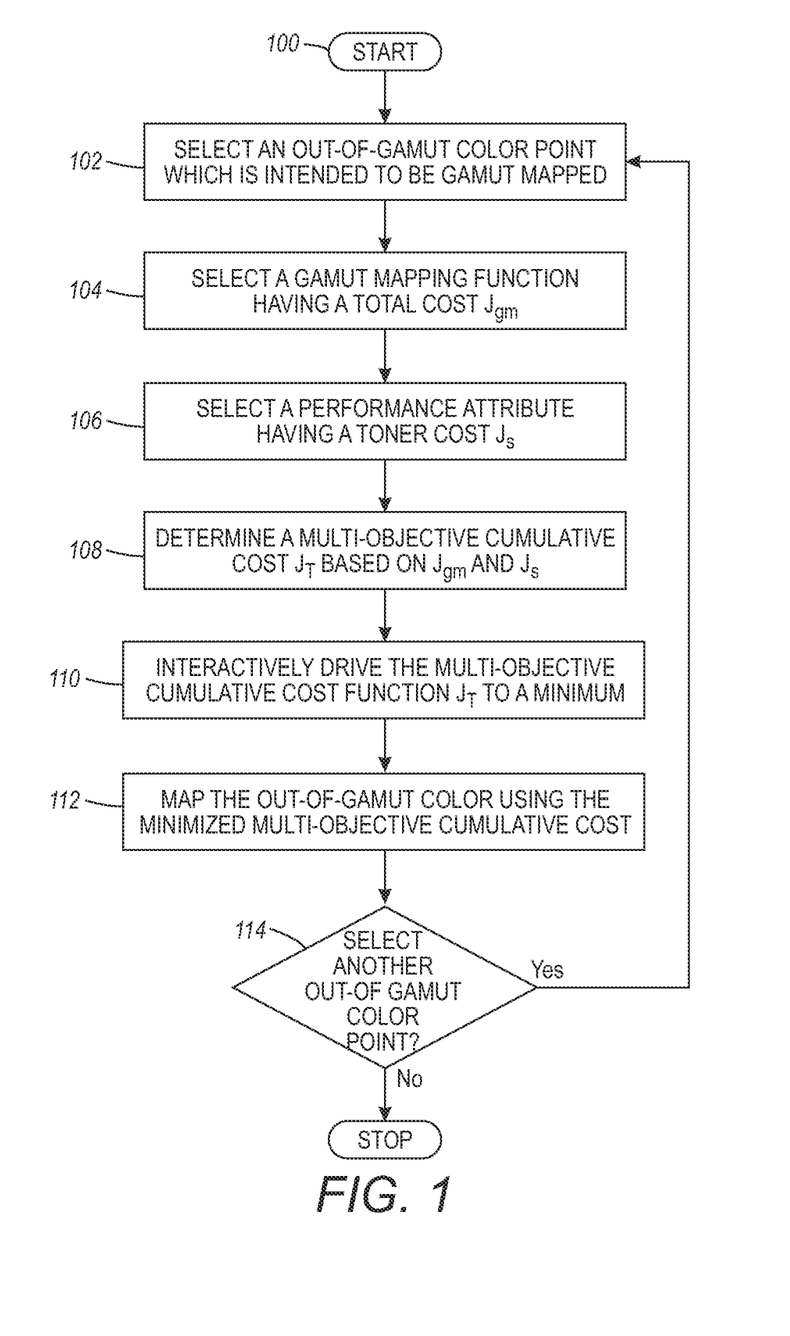
FIG. 1 is a flow diagram of one example embodiment of the present method for mapping out-of-gamut colors to a device's gamut to improve image quality in a color document reproduction device.

Reference is now being made to the flow diagram of FIG. 1 which illustrates one example embodiment of the present method for mapping out-of-gamut colors to a device's gamut to improve image quality in a color document reproduction device. Flow processing starts at step 100 and immediately proceeds to step 102.

At step 102, an out-of-gamut color $x_i$ is identified. The selected out-of-gamut color is intended to be mapped to a boundary surface of a color gamut of a color marking device.

At step 104, a gamut mapping function is then selected which is intended to be applied to the out-of-gamut color point. In one embodiment, the cost $J_{gm}$ represents the cost of mapping the out-of-gamut color point $x_i$ of step 102 using the gamut mapping function.

At step 106, at least one performance attribute is then selected for the color marking device having a total cost $J_s$ of applying the selected performance attribute.

Figure 2:
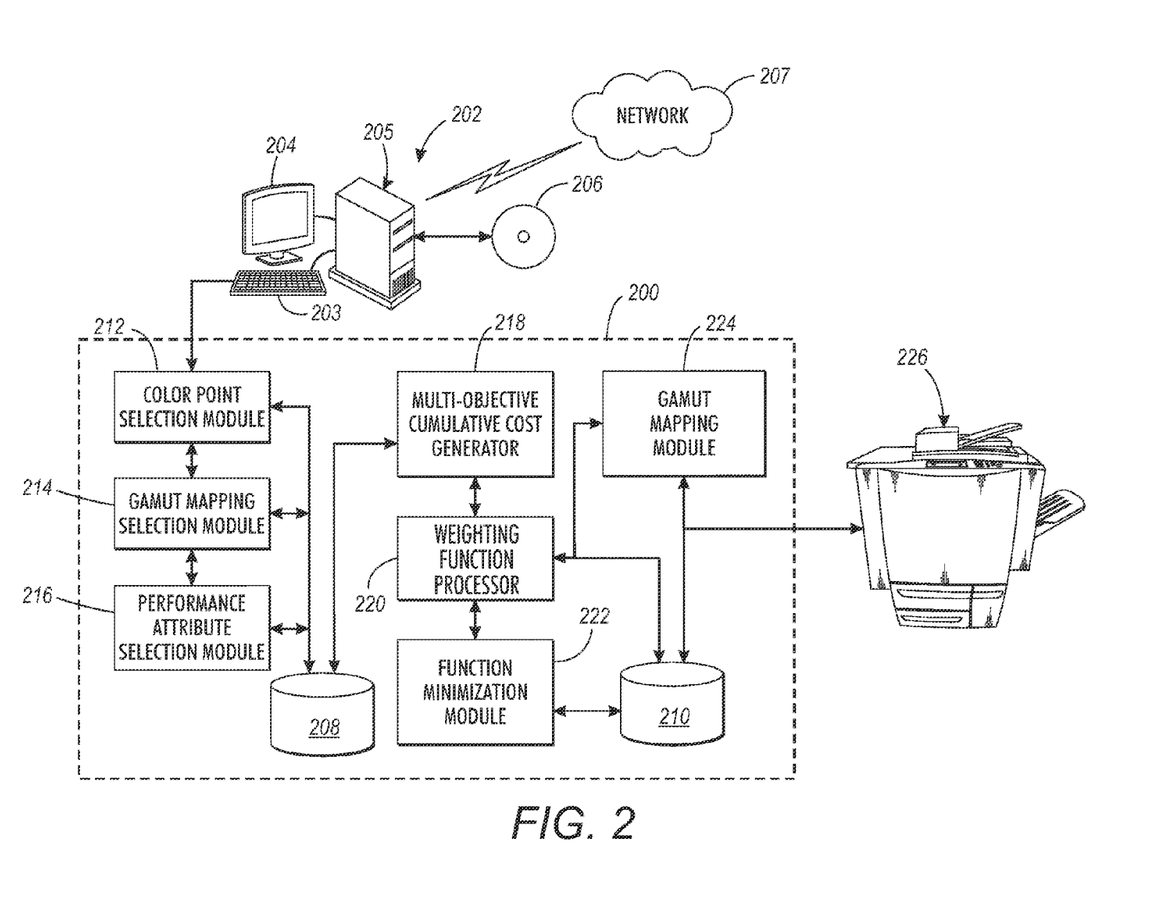
FIG. 2 illustrates a block diagram of one example color processing system wherein various aspects of the embodiment shown and described with respect to the flow diagram of FIG. 1 may be implemented in the image path of a color marking device.

Any of above-described out-of-gamut color point, the gamut mapping function, and the performance attribute can be selected by a user using, for example, the computer workstation 202 of FIG. 2. Such inputs and/or values in this regard may also be retrieved from a remote device over a network or retrieved from a storage device such as storage disks 208 and 210.

At step 108, a multi-objective cumulative cost $J_T$ is determined based upon a combination of cost $J_{gm}$ and cost $J_s$.

At step 110, the multi-objective cumulative cost is iteratively driven to a minimum. A feedback loop can be employed to effectuate this. Such a feedback loop can be on a combined printer and IQ model, or on a printer with an IQ model or operating directly on a color marking device equipped with color sensors. The present method can be performed by directly iterating on the printer with inline or offline spectral sensors (spot or full width array based), and hence offers the abilities to provide constrained gamut mapping of out-of-gamut colors not just for optimized color, but also for optimized IQ.

At step 112, the out-of-gamut color is gamut mapped using the minimized multi-objective cumulative cost.

At step 114, a determination is made whether any more out-of-gamut colors remain to be identified or otherwise selected. If so, the processing repeats with respect to step 102 wherein a next out-of-gamut color is identified. A gamut mapping function is then selected which is intended to be applied to the out-of-gamut color point and at least one performance attribute is selected for the color marking device. A multi-objective cumulative cost can then be determined and subsequently driven to a minimum using an iterative approach. The out-of-gamut color can then be gamut mapped using the minimum multi-objective cumulative cost. Processing repeats in such a manner until no more out-of-gamut color points have been identified or selected. Thereafter, processing stops.

Various Considerations

The following approach has limited use but may be useful when customers are not willing to relax the location on the printer's gamut where they want to map colors to. The location is chosen based on known gamut mapping method with assigned parameters (e.g., minimum deltaE2K, cusp, chromatic, etc. with say for cusp gamut mapping, hue and hue range are already assigned). It is well known that colors located on the boundary have only one CMYK or N-color recipe that will result in the mapped color selected by a particular gamut mapping method with assigned parameters. However, there are some exceptions found in nonlinear printers where more than one solution might exist. It would be useful to explore the non-uniqueness of those situations. It should be clear at this point that this method is only useful for cases where multiple solutions exist for colors either on or close to the boundary. Weights for Eqs. (1) and (2) are preferably chosen based upon an importance assigned to the desired performance parameter.

The problem can be solved by implementing following steps (described for single color expressed as L*a*b*):

Map the out-of-gamut color to the desired location of the printers gamut, $L^*a^*b^*_m$. A variety of well-established techniques can be utilized to accomplish this.

Check whether there exist several x values that can reproduce the color accurately (i.e., with minimum deltaE2K or with cusp/chromatic gamut mapping etc.). If not, stop. Otherwise, continue with the following step.

M represents number of x values and is generally small for a 4 color printer, but it can be high for >4 color printer as in N-color printers with N>4. To compute several values, use a printer model and an inversion algorithm.

For each $x_k$, k=1, 2, ..., M, compute $J_S^k$.

Find k*=arg $\min_k J_S^k$.

Use $x_{k*}$ for rendering color $L^*a^*b^*_m$.

Trade-Off between Gamut Mapping and Performance Attribute

When customers are focused on relaxing the optimal gamut mapping location at the expense of improving the performance attribute, following two cases offer opportunities to satisfy these requirements.

Case A: Changing Gamut Mapping Parameters Followed by Constraining the Performance Attribute:

This can be used when the gamut mapping algorithm has parameters that can be modified (e.g., hue range and range are options found in some methods) to change the location where the original color L*a*b* will be mapped to. This is different from the embodiment described above, in which it has been assumed that default values have been used for that scenario. Thus, the flow for this case is as follows:

Find the mapped $L^*a^*b^*_{m,k}$ for each k, k=1, ..., M, for combinations of parameters found in the type of gamut mapping method of interest. Proceed to determine $x_k$ associated with each $L^*a^*b^*_{m,k}$.

For each $x_k$, compute $J_S^k$ and then find k*=arg $\min_k J_S^k$.

Use $x_{k*}$ for rendering color $L^*a^*b^*_{m,k}$.

Case B: Minimization of Global Cumulative Cost $J_T$:

One can think of this as a global optimization problem. Find $x^* \in R^n$ that satisfies Min $J_T$ such that every element in the vector x*, satisfies 0≤x*(k)≤255.

There are several ways to define $J_T$. For example, one option is to define $w_{gm}=p$, where $\underline{p} \leq p \leq 1$, and $w_i=1$, for each i, such that:

$$J_T = p^* J_{gm} + (1-p)^* J_s \quad (10)$$

where $J_s$ is now defined as shown in Eq. (3) and where $\underline{p}>0$ is a value that does not degrade too much of the gamut mapping results. Notice that if $\underline{p}=0$ or a small value then all the emphasis will be put on minimizing the performance attribute resulting in poor gamut mapping.

Example Color Processing System

Reference is now being made to FIG. 2 which illustrates a block diagram of one example color processing system wherein various aspects of the embodiment shown and described with respect to the flow diagram of FIG. 1 may be implemented in the image path of a color marking device.

The illustrated embodiment of the example color processing system 200 of FIG. 2 is shown generally comprising a computer workstation 202 which includes a keyboard 203, monitor 204, case 205 housing a motherboard, processor, hard drive, CD-ROM drive, and a network interface card (not shown), and rewriteable media 206 for storing executable machine readable program instructions and data. Computer workstation 202 is in communication with one or more devices over network 207, including storage devices 208 and 210, which may be the same device or memory. Any of the storage devices may comprise memory, cache memory, ROM/RAM, a database system, or a remote device accessible over network 207.

Color Point Selection Module 212 enables the user to select or otherwise identify at least one out-of-gamut color $x_i$, as described with respect to step 102 of the flow diagram of FIG. 1. The selected out-of-gamut color is intended to be mapped to a boundary surface of a color gamut of a color marking device. Gamut Mapping Identifier Module 214 enables the user to select or otherwise identify a gamut mapping function which is intended to be applied to the out-of-gamut color point. Such a selection is described above with respect to step 104 of FIG. 1. Module 214 may receive input and communicate with Out-Of-Gamut Selection Module 212. As described more fully above, cost $J_{gm}$ represents the cost of mapping the out-of-gamut color point $x_i$ of step 102 using the selected gamut mapping function. Performance Attribute Selection Module 216 enables the user to select at least one performance attribute for color marking device 226. Various aspects of performance attribute selection are described above with respect to step 106 of FIG. 1. Modules 212, 214, and 216 read/write their respective identified values to storage device 208. Any of these modules may receive inputs from the workstation 205 or, alternatively, from a remote device over network 207.

Multi-Objective Cumulative Cost Generator 218 determines the multi-objective cumulative cost $J_T$ based upon a combination of the cost of the gamut mapping function $J_{gm}$ and the cost of the function $J_s$ for the out-of-gamut color point identified in Color Point Selection Module 212. Such an embodiment is described above with respect to step 108 of FIG. 1. Weighting Function Processor 220 may, in one embodiment, apply a weighting $w_{gm}$ to the cost of the gamut mapping function ($J_{gm}$) such that the multi-objective cumulative cost comprises the embodiment described above with respect to Eqs. (5) and (6). Function Minimization Processor 222 iteratively drives the multi-objective cumulative cost $J_T$ to a minimum. Such a module is in communication with one or both of Modules 218 and 220 and may, as shown, be in communication with storage devices 208 and 210. Although connections are not shown, it should be appreciated that any of the modules of FIG. 2 can be placed in communication with any of the other modules, systems, or storage devices, via a wired or wireless communications interface. Weighting Function Processor 222 may be a feedback loop on a combined printer and IQ model, or on a printer with an IQ model or operating directly on color marking device 226 equipped with color sensors. Results and temporary computational values may be iteratively stored and retrieved from one or more storage devices and/or communicated to workstation 202 or to a remote device over network 207. Lastly, in the illustrated embodiment of FIG. 2, Gamut Mapping Module 224 maps the out-of-gamut color using the minimized multi-objective cumulative cost. Values may be stored and/or retrieved, as needed, from database 210. The mapped color point is then provided to color marking device 226.

Color Marking Device 226 incorporates a user interface comprising a display and keypad for entering or selecting values. The user interface may further be used to set parameters and control image processing operations. The instructions for these various operations may be input via a touch screen display. Such a system would further include various device controllers and other special purpose computer processors capable of executing machine executable program instructions. Such a device would include one or more network connections for receiving and/or transmitting data over a network via a wire, cable, modem, or wireless device, and may further incorporate a CD-ROM or other storage device wherein a removable media can be inserted and data deposited thereon.

Figure 3:
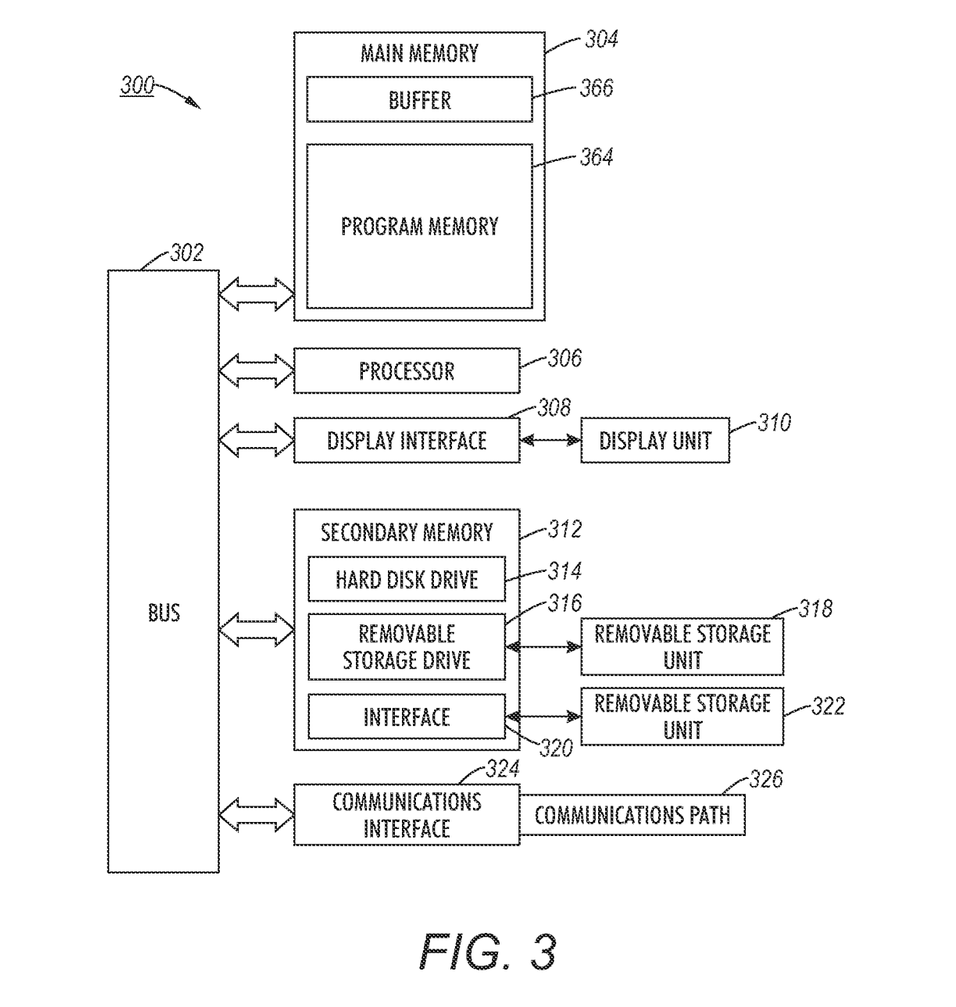
FIG. 3 illustrates a block diagram of one example embodiment of a special purpose computer system for implementing one or more aspects of the present method as described with respect to the embodiments of the flow diagram of FIG. 2 and the block diagram of FIG. 2.

It should be appreciated that any of the modules and/or processing units shown and described with respect to the block diagram of FIG. 2 are in communication with computer workstation 202, and some or all of the functionality for any of these may be performed, in whole or in part, by workstation 202 or by a special purpose computer system as shown in FIG. 3. It should be appreciated that various modules may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system such as workstation 202, and may also be practiced in distributed computing environments where tasks are performed by remote devices that are linked through communication network 207.

Example Special Purpose Computer System

Reference is now being made to FIG. 3 which illustrates a block diagram of one example embodiment of a special purpose computer system for implementing one or more aspects of the present method as described with respect to the embodiments of the flow diagram of FIG. 2 and the block diagram of FIG. 2. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 300 includes processor 306 for executing machine executable program instructions for carrying out all or some of the present method. The processor is in communication with bus 302. The system includes main memory 304 for storing machine readable instructions. Main memory may comprise random access memory (RAM) to support reprogramming and flexible data storage. Buffer 366 stores data addressable by the processor. Program memory 364 stores machine readable instructions for performing the present method. A display interface 308 forwards data from bus 302 to display 310. Secondary memory 312 includes a hard disk 314 and storage device 316 capable of reading/writing to removable storage unit 318, such as a floppy disk, magnetic tape, optical disk, etc. Secondary memory 312 may further include other mechanisms for allowing programs and/or machine executable instructions to be loaded onto the processor. Such mechanisms may include, for example, a storage unit 322 adapted to exchange data through interface 320 which enables the transfer of software and data. The system includes a communications interface 324 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 326 which carries such signals and may be implemented using wire, cable, fiber optic, phone line, cellular link, RF, memory, or other means known in the arts.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system. The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for mapping out-of-gamut colors to a device's gamut to improve image quality in a color document reproduction device, the method comprising:

identifying an out-of-gamut color point $x_i$ intended to be mapped to a boundary surface of a color gamut of a color marking device;

selecting a gamut mapping function to be applied to said out-of-gamut color point, where $J_{gm}$ represents a cost of mapping out-of-gamut color point $x_i$ using said gamut mapping function;

selecting at least one performance attribute for said color marking device where $J_s$ represents a total cost of applying said selected at least one performance attribute and $J_i$ is an $i^{th}$ performance attribute;

determining a multi-objective cumulative cost comprising:

$$J_T = J_{gm} + J_s;$$

iteratively driving said multi-objective cumulative cost $J_T$ to a minimum; and communicating said minimized multi-objective cumulative cost to a color management system of said color marking device wherein a processor executes machine readable program instructions for performing a gamut mapping of said out-of-gamut color point $x_i$ using said minimized multi-objective cumulative cost.

2. The method of claim 1, wherein said total cost of applying said selected at least one performance attributes comprises:

$$J_S = \sum_{i=1}^{N} J_i$$

where N is the number of performance attributes selected.

3. The method of claim 2, further comprising applying a weighting $w_i$ such that said total cost $J_S$ comprises:

$$J_S = \sum_{i=1}^{N} w_i J_i.$$

4. The method of claim 1, further comprising applying a weighting $w_{gm}$ such that said multi-objective cumulative cost comprises:

$$J_T = w_{gm} J_{gm} + J_s.$$

5. The method of claim 1, wherein said total cost of applying said selected at least one performance attribute comprises:

$$J_S = \sum_{i=1}^{N} w_i (J_i^d - J_i)^2,$$

where N is the number of performance attributes selected, $w_i$ is a weighting, and $J_i^d$ is a desired cost associated with the $i^{th}$ performance attribute.

6. The method of claim 1, wherein said multi-objective cumulative cost comprises:

$$J_T = w_{gm}(J_{gm}^d - J_{gm})^2 + J_s,$$

where $J_{gm}^d$ is a desired cost associated with said gamut mapping function.

7. The method of claim 1, wherein said multi-objective cumulative cost comprises:

$$J_T = w_{gm}(J_{gm}^d - J_{gm})^2 + \sum_{i=1}^{N} w_i (J_i^d - J_i)^2.$$

8. A system for mapping out-of-gamut colors to a device's gamut to improve image quality in a color document reproduction device, the system comprising:
   a memory;
   a storage medium for storing data; and
   a processor in communication with said storage medium and said memory, said processor executing machine readable instructions for performing the method of:
      identifying an out-of-gamut color point $x_i$ intended to be mapped to a boundary surface of a color gamut of a color marking device;
      selecting a gamut mapping function to be applied to said out-of-gamut color point, where $J_{gm}$ represents a cost of mapping out-of-gamut color point $x_i$ using said gamut mapping function;
      selecting at least one performance attribute for said color marking device where $J_s$ represents a total cost of applying said selected at least one performance attribute and $J_i$ is an $i^{th}$ performance attribute;
      determining a multi-objective cumulative cost comprising:

$$J_T = J_{gm} + J_s;$$

iteratively driving said multi-objective cumulative cost $J_T$ to a minimum; and
      performing a gamut mapping of said out-of-gamut color point $x_i$ using said minimized multi-objective cumulative cost.

9. The system of claim 8, wherein said total cost of applying said selected at least one performance attributes comprises:

$$J_S = \sum_{i=1}^{N} J_i$$

where N is the number of performance attributes selected.

10. The system of claim 9, further comprising applying a weighting $w_i$ such that said total cost $J_S$ comprises:

$$J_S = \sum_{i=1}^{N} w_i J_i.$$

11. The system of claim 8, further comprising applying a weighting $W_{gm}$ such that said multi-objective cumulative cost comprises:

$$J_T = w_{gm} J_{gm} + J_s.$$

12. The system of claim 8 wherein said total cost of applying said selected at least one performance attribute comprises:

$$J_S = \sum_{i=1}^{N} w_i (J_i^d - J_i)^2,$$

where N is the number of performance attributes selected, $w_i$ is a weighting, and $J_i^d$ is a desired cost associated with the $i^{th}$ performance attribute.

13. The system of claim 8, wherein said multi-objective cumulative cost comprises:

$$J_T = w_{gm}(J_{gm}^d - J_{gm})^2 + J_s,$$

where $J_{gm}^d$ is a desired cost associated with said gamut mapping function.

14. The system of claim 8, wherein said multi-objective cumulative cost comprises:

$$J_T = w_{gm}(J_{gm}^d - J_{gm})^2 + \sum_{i=1}^{N} w_i (J_i^d - J_i)^2.$$

15. A computer implemented method for mapping out-of-gamut colors to a device's gamut to improve image quality in a color document reproduction device, the method comprising:
   identifying an out-of-gamut color point $x_i$ intended to be mapped to a boundary surface of a color gamut of a color marking device;
   selecting a gamut mapping function to be applied to said out-of-gamut color point, where $J_{gm}$ represents a cost of mapping out-of-gamut color point $x_i$ using said gamut mapping function;
   selecting a total of N performance attributes for said color marking device where $J_s$ represents a total cost of applying said selected performance attributes, said total cost comprising:

$$J_S = \sum_{i=1}^{N} J_i$$

where $J_i$ is the $i^{th}$ performance attribute and N is the number of performance attributes selected;

determining a multi-objective cumulative cost comprising:

$$J_T = J_{gm} + J_s;$$

iteratively driving said multi-objective cumulative cost $J_T$ to a minimum; and communicating said minimized multi-objective cumulative cost to a color management system of said color marking device wherein a processor executes machine readable program instructions for performing a gamut mapping of said out-of-gamut color point $x_i$ using said minimized multi-objective cumulative cost.

16. The computer implemented method of claim 15, further comprising applying a weighting $w_{gm}$ such that said multi-objective cumulative cost comprises:

$$J_T = w_{gm} J_{gm} + J_s.$$

17. The computer implemented method of claim 15, further comprising applying a weighting $w_i$ such that said total cost $J_s$ comprises:

$$J_S = \sum_{i=1}^{N} w_i J_i.$$

18. The computer implemented method of claim 15, wherein said total cost of applying said selected at least one performance attribute comprises:

$$J_S = \sum_{i=1}^{N} w_i (J_i^d - J_i)^2,$$

where N is the number of performance attributes selected, $w_i$ is a weighting, and $J_i^d$ is a desired cost associated with the $i^{th}$ performance attribute.

19. The computer implemented method of claim 15, wherein said multi-objective cumulative cost comprises:

$$J_T = w_{gm}(J_{gm}^d - J_{gm})^2 + J_s,$$

where $J_{gm}^d$ is a desired cost associated with said gamut mapping function.

20. The computer implemented method of claim 15, wherein said multi-objective cumulative cost comprises:

$$J_T = w_{gm}(J_{gm}^d - J_{gm})^2 + \sum_{i=1}^{N} w_i (J_i^d - J_i)^2.$$

* * * * *